US006637156B2

United States Patent
Stewart

(10) Patent No.: US 6,637,156 B2
(45) Date of Patent: Oct. 28, 2003

(54) EXTENDABLE FLOWER POT

(76) Inventor: Ronald J. Stewart, 1000 Leslie Rd. #D, El Cajon, CA (US) 92020

( * ) Notice: Subject to any disclaimer, the term of this patent is extended or adjusted under 35 U.S.C. 154(b) by 20 days.

(21) Appl. No.: 09/770,079

(22) Filed: Jan. 26, 2001

(65) Prior Publication Data

US 2002/0100214 A1 Aug. 1, 2002

(51) Int. Cl.$^7$ .............................. A01G 9/02; A01G 27/04
(52) U.S. Cl. .............................. 47/82; 47/66.1; 47/71; 220/8
(58) Field of Search .............................. 47/82, 84, 72, 47/73, 81, 75, 66.1, 41.01, 71; 220/8

(56) References Cited

U.S. PATENT DOCUMENTS

| | | |
|---|---|---|
| 866,449 A | 9/1907 | Feist |
| 879,753 A * | 2/1908 | Eckert .............................. 220/8 |
| 1,093,873 A * | 4/1914 | Mitchell .............................. 220/8 |
| 1,224,519 A | 5/1917 | Brenner et al. |
| 1,251,552 A | 1/1918 | Marks |
| 1,557,712 A * | 10/1925 | Little .............................. 47/65.6 |
| 2,893,167 A * | 7/1959 | Davidson .............................. 220/8 |
| 4,145,841 A * | 3/1979 | Woolpert .............................. 47/66.1 |
| 4,481,733 A * | 11/1984 | Jacobs .............................. 47/66.6 |
| 4,574,969 A | 3/1986 | Mays .............................. 220/8 |
| 5,101,996 A | 4/1992 | Mosley .............................. 220/8 |
| 5,404,672 A | 4/1995 | Sanderson .............................. 47/82 |
| D366,855 S | 2/1996 | Deelen .............................. D11/152 |
| 5,491,929 A * | 2/1996 | Peacock et al. .............................. 47/41.01 |
| 5,862,932 A | 1/1999 | Walsh et al. .............................. 220/8 |

* cited by examiner

Primary Examiner—Charles T. Jordan
Assistant Examiner—Susan C. Alimenti
(74) Attorney, Agent, or Firm—Mary Jo Redman; Calif Tervo

(57) ABSTRACT

Extendable flower pot (10) for holding a plant comprises bottom pot (30) and extendable upper barrel (20). Upper barrel (20) is adapted to nest inside bottom pot (30). A plant is potted in flower pot (10) in a nested position. When the plant needs more room for its roots, upper barrel (20) is pulled to an extended position, increasing the depth and volume of pot (10). Additional soil is then added. Rim (22) aids gripping of upper barrel (20) and keeps water and soil out of the gap between bottom pot (30) and upper barrel (20) when flower pot (10) is in the nested position. Upper annular protrusion (21') and bottom annular protrusion (31') cooperate to stop upper barrel (20) from accidentally being pulled out of bottom pot (30).

7 Claims, 1 Drawing Sheet

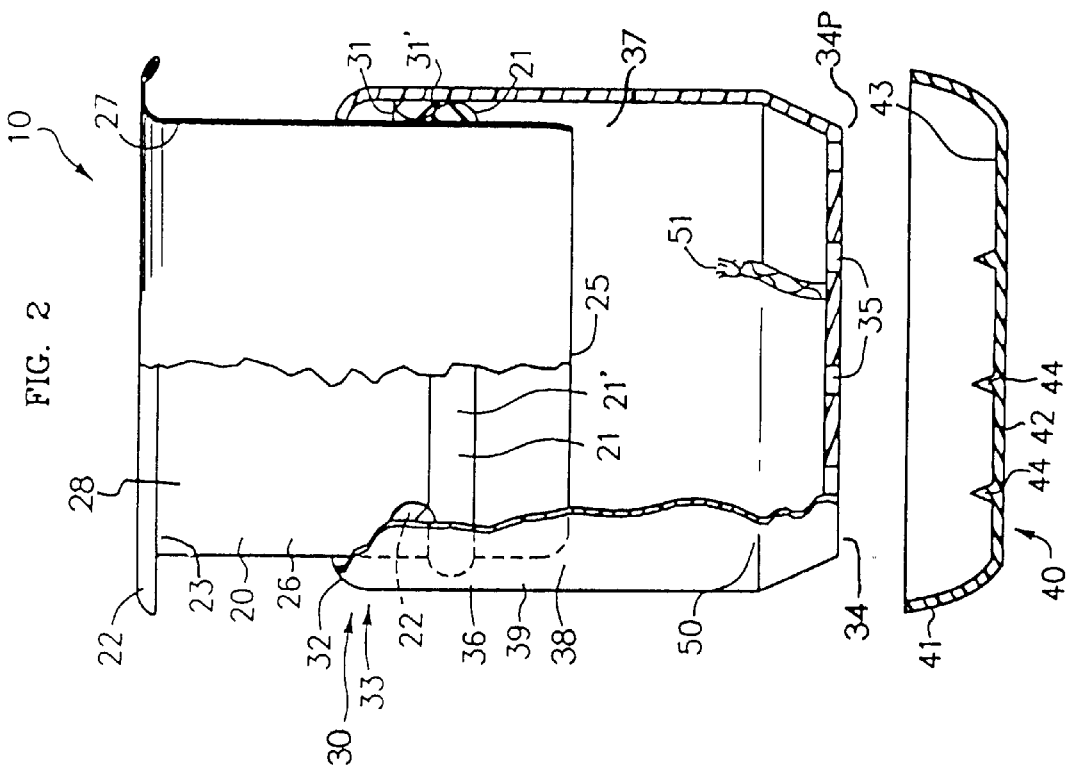
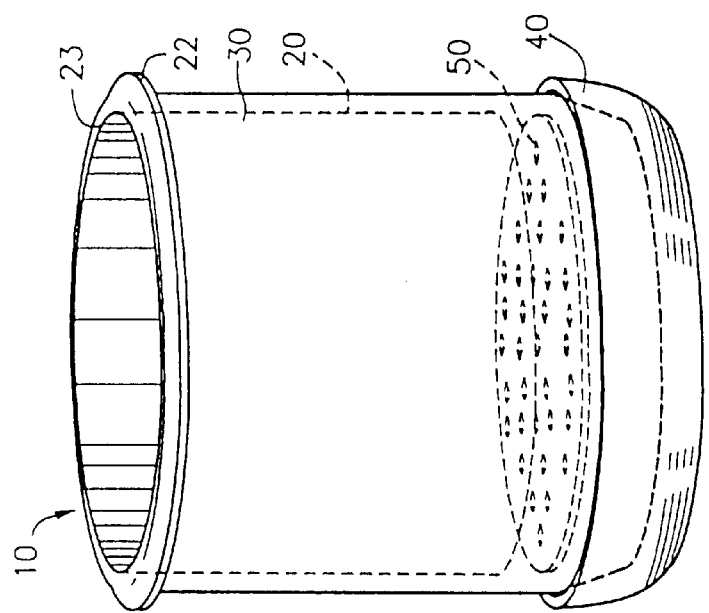

EXTENDABLE FLOWER POT

FIELD OF THE INVENTION

This invention relates to a container for a plant, and more specifically to a pot that can be extended to increase its volume and height.

BACKGROUND OF THE INVENTION

Plants are grown in containers for many reasons, including the desire to be able to move the plant around easily and to grow plants indoors or where no open soil is available. Until plastic became a favored material for plant containers, plants were usually potted in ceramic containers of circular cross-section that were considerably smaller at the bottom than at the top. Due to the fairly thick walls of the clay pots, a substantial taper was needed to allow pots to be stacked when empty.

Today, commercial nurseries typically grow and sell plants potted in round or square plastic containers that are only slightly smaller at the bottom than at the top, since the plastic containers need not be as thick as clay.

A person growing a plant at home, whether outside or inside the house, often prefers to pot the plant in a decorative container. Since the home gardener does not need to stock large quantities of uniform containers, pots for home use may be of any shape or material. Pots used outdoors are still often clay, wood, or other traditional materials.

Plastic is becoming the preferred material for pots used inside the house, due to its impermeability to water and light weight. Plastic pots with water-catching saucers or internal drainage means can be kept very clean on the outside and are unlikely to cause damage to furnishings due to water, soil, or decomposition of the pot itself.

Many decorative plastic pots for home use are still designed with a tapering shape to resemble traditional clay pots. Such tapered pots have two main disadvantages: they hold less soil than a non-tapered pot, and they encourage the roots to converge toward the center of the pot and become a tangled mass. When a plant with a dense tangle of roots is transplanted to a larger pot, the roots often do not spread out and the plant stays stunted. Thus, tapered sides give a pot a traditional appearance, but are not the best for the plant's health.

Thin plastic pots can be made with nearly straight sides, which is healthier for the roots. A pot that is larger at the bottom than at the top is even better for the plant, but is more difficult to make and to transplant a plant out of. When a plant grows too large for its pot, it is taken out of that pot and transplanted into a larger one, with additional soil.

It can be difficult to maintain the proper soil moisture for potted plants. The top of the soil tends to be too dry and the bottom tends to be too wet. To help maintain a proper balance, it is recommended that plants be transplanted into a pot that is only slightly wider than the one it was in, such that there is a gap of no greater than one inch between the root ball and the wall of the new pot.

People who don't have large yards, especially those who live in apartments, are reluctant to transplant their houseplants because of the mess that can result from removing the plant from its pot. This reluctance can cause them to wait too long before transplanting, or to buy a pot that is excessively large so that they don't have to re-transplant, which may result in root rot.

Hence, there is a need for a pot that makes it possible to give a plant a larger pot without making a mess. This need is partly met by the Collapsible Plant Container of Davidson (U.S. Pat. No. 2,893,167). Davidson discloses a pot that has segmented sides that slide up to form a pot and collapse to allow easier transplanting. However, it is still necessary to transfer the plant to a different pot. The segments of the Davidson pot overlap on the exterior of the pot, leading to three potential problems. First, the Davidson pot is smaller at the bottom than at the top, which leads to the root problems discussed above. Second, when the pot is in any configuration except the most fully extended, there are exposed gaps between the segments that will collect moisture and debris, which will nurture insects and mold. Third, because each segment has a larger diameter the one it overlays, there is potential for leakage of water and dirt through the joints. Davidson discloses locking means that "functions as a positive water or liquid seal for the container"; however, this seal could fail if the pot has been mechanically damaged or if the locking means has soil interfering with the tight fit needed.

There is a need for a pot for houseplants that will not create mess or damage in the house, even when the plant requires a larger pot. There is a further need for a pot that has maximal soil volume for its width and that discourages rootbinding. There is a need for a pot that is expandable, so that a person does not need to find a new pot of the correct size, or store an empty one. There is still further a need for such a pot to be inexpensive and simple to manufacture.

SUMMARY OF THE INVENTION

This invention is an extendable flower pot, comprising a bottom pot with an extra section of wall, or upper barrel, nested inside. The upper barrel is telescoped inside the bottom pot when a plant is initially planted in the flower pot. From the outside the telescoped flower pot appears to be a standard decorative flower pot.

After the plant has grown and needs additional room for its roots, the extra section, or upper barrel, is pulled upward. The root ball of the plant is left at its original level and the upper barrel is pulled up around it. Additional potting soil is added to the top of the upper barrel. The plant will sprout new roots along the buried part of its stem.

Alternatively, the plant may be lifted along with the upper barrel by supporting its stem. Additional potting soil is added to the top of the upper barrel and gently shaken into place below and around the root ball of the plant. The plant now has a volume of fresh soil under its existing root ball. Because the bottom pot is slightly wider than the upper barrel, the roots spread both downward and outward into the fresh soil. The roots are not encouraged to form a dense mass toward the center of the pot, as they are when a pot is wider at the top than at the bottom.

Either method of adding soil volume does not require the plant to be removed from the pot and therefore does not cause soil and bits of root to be scattered, as the traditional method of transplanting does. A retention mechanism prevents the sections from accidentally being pulled completely apart.

These features, taken together, make the extendable flower pot especially appropriate for use indoors. The expandable flower pot has little potential for creating mess or damaging furnishings, no empty pot needs to be stored after the plant is transplanted, and there is no danger of choosing a wrong-sized pot for transplanting.

Other features and attendant advantages of the invention will become apparent upon a reading of the following detailed description, together with the drawings in which like reference numerals refer to like parts throughout. Certain exemplary embodiments will be described, although many modifications and variations are possible. It is therefore to be understood that, within the scope of the appended claims, the invention may be practiced otherwise than as specifically described.

BRIEF DESCRIPTION OF THE DRAWINGS

FIG. 1 is a perspective view of the expandable flower pot in the nested position.

FIG. 2 is a side elevation view, partially cut-away and partially exploded.

DETAILED DESCRIPTION OF THE DRAWINGS

FIG. 1 is a perspective view of the invention 10 in a nested position. The invention generally comprises a bottom pot 30 for holding a plant and an upper barrel 20 that can nest inside bottom pot 30 or be extended upward to increase the volume of flower pot 10. Barrel 20 has a rim 22. In a preferred embodiment, flower pot 10 further comprises saucer 40 for catching excess water.

FIG. 2 is a partially exploded side elevation view of flower pot 10 in an extended position and partially cut-away. Bottom pot 30 has a bottom 34, with a periphery 34P. Bottom side wall 37 is attached to and extends upward from periphery 34P. Bottom 34 and bottom side wall 37, taken together, define a cup or box shape with an open top. Bottom side wall 37 includes an interior surface 38, an exterior surface 39, upper part 33, and upper edge 32.

Upper barrel 20 does not have a bottom, has a shape congruent to that of side wall 37 of bottom pot 30, and is adapted to nest snugly inside bottom pot 30. It comprises upper side wall 26, having an interior surface 27 and exterior surface 28, lower part 29, lower edge 25, and upper edge 23. Rim 22 is attached around upper edge 23 and extends radially out from it.

Rim 22 serves as a grip to facilitate pulling upper barrel 20 to an extended position. Rim 22 also acts as a means for keeping water, soil, or plant debris from falling into the small gap between the interior surface 38 of bottom side wall 37 and exterior surface 28 of upper side wall 26 when flower pot 10 is in use in the nested position. Moisture and debris between walls 37,26 could nurture mold or insects, and require upper side wall 26 to be cleaned after barrel 20 is extended. As can be understood from FIG. 2, rim 22 is wider than upper edge 32 of bottom side wall 37. When flower pot 10 is in the nested position, rim 22 overlaps upper edge 32 of bottom side wall 37 and, in a preferred embodiment, rests on upper edge 32 when upper barrel 20 is nested inside bottom pot 30.

In another preferred embodiment, upper part 33 of bottom pot 30 curves inward to enclose the gap between interior surface 38 of bottom pot 30 and exterior surface 28 of upper barrel 20. In this embodiment, the inside diameter of upper edge 32 is substantially the same as the outside diameter of upper side wall 26.

To use flower pot 10, a person fills upper barrel 20 with a potting medium, such as soil, while upper barrel 20 is nested inside bottom pot 30, and plants a plant in the soil. The plant is watered by pouring water into upper barrel 20, while either rim 22 or inward-curving upper part 33 keeps water from splashing between the two sections of pot 10. So that water does not accumulate in the root zone of the plant, bottom pot 30 also comprises a drainage pan 50, parallel to and spaced above bottom 34. Drainage pan 50 is preferably a disk perforated by holes of about 2–5 mm diameter. In one embodiment, drainage pan 50 has a diameter slightly less than the inner diameter of upper part 33 of bottom side wall 37. Bottom side wall 37 tapers in slightly above bottom 34, such that drainage pan 50 interferes with interior surface 38 and is held above bottom 34. In another embodiment, drainage pan 50 includes a plurality of legs (not shown) that contact bottom 34 and hold drainage pan 50 above bottom 34.

In another embodiment, flower pot 10 further comprises a wicking means 51 for transferring water from below drainage pan 50 to above drainage pan 50 by capillary action, such as fibrous wick 51'. Wick 51' reuses excess water that drains below drainage pan 50 by returning it to the soil after the soil has dried out sufficiently that capillary action can draw the water up wick 51'. Other wicking means 51 are envisioned but not illustrated.

In another preferred embodiment, bottom 34 of bottom pot 30 includes drainage holes 35. Excess water that drains from drainage holes 35 is retained by saucer 40. Saucer 40 includes a bottom 42 having an interior surface 43, a closed side wall 41 attached to bottom 42, and means, such as prongs 44 that removably engage drainage holes 35, for removably attaching saucer 40 to exterior surface 36 of bottom 34 of bottom pot 30.

When the plant needs a larger pot, the person extends flower pot 10 to increase the volume of soil pot 10 can hold. The person grips the upper barrel by upper edge 23 or rim 22 and pulls upward to slide upper barrel 20 to an extended position. The root ball of the plant is left at its original level and upper barrel 20 is pulled up around it. Additional potting soil is added into the top of upper barrel 20. Some plants, such as potatoes and tomatoes, readily sprout new roots along the buried part of the stem.

Alternatively, the plant may be lifted along with upper barrel 20 by supporting its stem. The person adds fresh potting soil into the open top of upper barrel 20 and causes it to settle under the plant's root ball by shaking or tapping bottom pot 30, or by pouring water onto the soil. Soil is added until the plant has soil to the same level on its stem as before pot 10 was extended. The plant now has fresh soil under its roots, but does not have an excessive layer of soil around or over the root ball. The soil is preferably premixed with plant nutrients before being added to flower pot 10, thus further encouraging roots to grow downward into bottom pot 30.

Although an extendable flower pot having a single upper barrel has been described, a pot having more than one extension barrel is envisioned and would be used in a similar manner.

After the additional soil has been added to pot 10 and settled by shaking or watering, upper barrel 20 is held in the extended position by soil underneath lower edge 25.

If upper barrel 20 were to completely disengage from bottom pot 30 when it is being extended, soil could be spilled or the plant damaged. To prevent this, upper barrel 20 and bottom pot 30 comprise cooperative retaining means 21 and 31, respectively.

In a preferred embodiment, wherein upper barrel 20 and bottom pot 30 are both cylindrical, upper retaining means 21 of upper annular protrusion 21' is slightly larger than the inside diameter of bottom annular protrusion 31', such that annular protrusions 21',31' do not easily slide past one another when upper barrel is extended upward. Side walls 26,37 are sufficiently flexible, such as by being made of thin plastic, that side walls 26,37 can be deformed to force annular protrusions 21',31' past each other when upper barrel 20 is assembled into bottom pot 30 during construction of flower pot 10.

Alternatively, lower retaining means 31 may be the inward-curving upper part 33 of bottom side wall 37. If the inside diameter of upper edge 32 is substantially the same as the outside diameter of upper side wall 26, upper annular protrusion 21' cannot be pulled past upper edge 32 unless side walls 26,37 are deformed.

When a person is extending pot 10, though, enough force to deform the side walls 26,37 is not exerted. Upper barrel 20 can be pulled upward until upper annular protrusion 21' contacts bottom annular protrusion 31'. Annular protrusions 21',31' interfere mechanically and retain upper barrel 20 within bottom pot 30.

As described, upper 21' and bottom annular protrusions 31' are solid rings encircling side walls 26,27. In another preferred embodiment, not illustrated, retaining means 21,31 are a plurality of transverse ridges arranged circumferentially on side walls 26,27, similarly to annular protrusions 21',31', but interrupted. In this embodiment, the transverse ridges are adapted such that the ridges on exterior surface 39 of bottom side wall 37 can cooperate with the ridges on interior surface 27 of upper side wall 26, but do not cooperate if upper barrel 20 is rotated a few degrees with respect to bottom pot 30. In other words, if the ridges of upper barrel 20 and the ridges of bottom pot 30 are aligned, they cooperate to retain upper barrel 20 inside bottom pot 30. If the ridges are not aligned, the ridges of upper barrel 20 pass between the ridges of bottom pot 30 when upper barrel 20 is extended, allowing upper barrel 20 to be disengaged from bottom pot 30.

In the preferred embodiment illustrated and described, upper barrel 20 and bottom pot 30 are circular in cross-section. In describing flower pot 10, terms such as diameter, annular, and barrel have been used. It is not meant thereby that extendable flower pot 10 is limited to a cylindrical shape. Other appropriate shapes are envisioned, such as shapes with square, rectangular, or other polygonal cross-section.

As mentioned above, upper barrel 20 has a smaller diameter than does bottom pot 30, and outward-extending rim 22 overlaps upper edge 32 of bottom pot 30, whereby water is kept from splashing accidentally into the gap between bottom pot 30 and upper barrel 20. A further advantage of upper side wall 26 overlapping interior surface 38 of bottom side wall 37, rather than exterior surface 39, derives from the result that bottom pot 30 therefore has a diameter that is greater than that of upper barrel 30 by the sum of the thicknesses of upper side wall 26 and bottom side wall 37. Surprisingly, for an extendable pot 10 having two sections, upper and bottom side wall thicknesses of one-eighth inch, a height of eleven inches for bottom pot 30, and a bottom pot diameter of fourteen inches, overlapping upper side wall 26 on bottom interior surface 38 yields a volume for bottom pot 30 approximately 100 cubic inches larger than if upper side wall 26 overlapped bottom exterior surface 36, as in Davidson and other prior art. The present invention is therefore healthier for the plant potted in it. Also, because bottom pot 30 has a larger diameter than upper barrel 20, there is no possibility of water or soil leaking from upper barrel 20.

Flower pot 10 is well-suited for use indoors, since expandable flower pot 10 has little potential for creating mess or damaging furnishings, no empty pot needs to be stored after the plant is transplanted, and there is no danger of choosing a wrong-sized pot for transplanting.

I claim:

1. An extendable flower pot of variable volume, comprising:
    a bottom pot, comprising:
        a bottom having a periphery;
        a closed bottom side wall attached along said periphery of said bottom; comprising:
            an interior surface; including
                a lower retaining means;
            an exterior surface;
            an upper part; including
                an upper edge; and
    an upper barrel adapted to nest within said bottom pot, comprising:
        a closed upper side wall; comprising:
            an interior surface;
            an exterior surface; including
                an upper retaining means;
            a lower part; including
                a lower edge; wherein:
    said upper barrel is slidable between a nested position substantially within said bottom pot and an extended position wherein said upper barrel is substantially disposed above said bottom pot and said lower part of said closed upper side wall overlaps said upper part of said closed bottom side wall; wherein:
    sliding said upper barrel from said nested position to said extended position increases the volume of said flower pot;
    said lower retaining means and said upper retaining means are for cooperating by mechanical interference to retain said upper barrel partially within said bottom pot; and:
    said upper part of said closed bottom side wall substantially seals against said closed upper side wall so as to prevent water from penetrating between said closed bottom side wall and said closed upper side wall.

2. An extendable flower pot as in claim 1, wherein:
    said closed upper side wall further comprises:
    an upper edge; and
    a peripheral rim overlapping said upper edge of said bottom pot.

3. An extendable flower pot as in claim 1, wherein:
    said lower retaining means comprises:
        a lower circumferential protrusion protruding inwardly from said interior surface of said closed bottom side wall and located below said upper edge; and
    said upper retaining means comprises:
        an upper circumferential protrusion protruding outwardly from said exterior surface of said closed upper side wall and located above said lower edge; and wherein:
    said lower circumferential protrusion and said upper circumferential protrusion are adapted to cooperate by mechanical interference to retain said upper barrel partially within said bottom pot.

4. An extendable flower pot as in claim 1, said bottom of said bottom pot including:
    a drainage hole.

5. An extendable flower pot of variable volume for containing soil for a plant, comprising:
    a bottom pot, comprising:
        a bottom; including
            a periphery; and
            drainage holes;

a closed bottom side wall attached along said periphery of said bottom; comprising:
  an interior surface; including
    a lower retaining means; comprising:
      a lower circumferential protrusion protruding inwardly from said interior surface of said bottom side wall and located below said upper edge;
  an exterior surface;
  an upper part; including
    an upper edge; and
an upper barrel adapted to nest within said bottom pot, comprising:
  a closed upper side wall; comprising:
    an interior surface;
    an exterior surface; including
      an upper retaining means; comprising:
        an upper circumferential protrusion protruding outwardly from said exterior surface of said upper side wall and located above said lower edge;
    a lower part; including
      a lower edge; wherein:
said upper barrel is slidable between a nested position substantially within said bottom pot and an extended position wherein said-upper barrel is substantially disposed above said bottom pot and said lower part of said upper side wall overlaps said upper part of said bottom side wall; and wherein:
sliding said upper barrel from said nested position to said extended position increases the volume of said flower pot; such that said upper barrel can be supported in said extended position by soil underneath said lower edge of said lower part of said upper side wall; and wherein:
said lower retaining means and said upper retaining means are for cooperating by mechanical interference to retain said upper barrel partially within said bottom pot; and wherein:
said upper part of said bottom side wall substantially seals against said upper side wall so as to prevent water from penetrating between said bottom side wall and said upper side wall.

6. An extendable flower pot as in clam 5, wherein:
  said closed upper side wall further comprises:
    an upper edge; and
    a peripheral rim overlapping said upper edge of said bottom pot.

7. An extendable flower pot as in claim 5, further including:
  a saucer; including:
    a closed side wall;
    a bottom; including
      an interior surface; and
    attaching means for removably attaching said interior surface to said bottom of said bottom pot.

* * * * *